Figure 1:
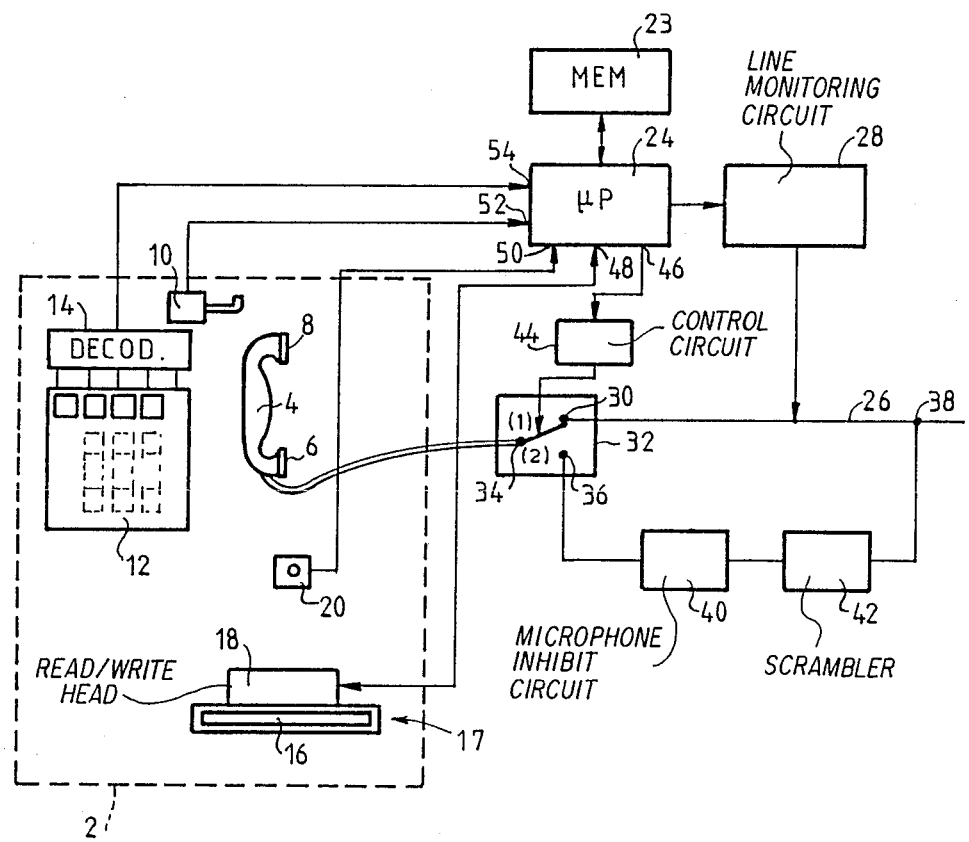

United States Patent [19]

Barraud

[11] Patent Number: 4,873,721
[45] Date of Patent: Oct. 10, 1989

[54] DEVICE FOR STARTING CHARGING IN A PAY PHONE

[75] Inventor: Claude Barraud, Paris, France

[73] Assignee: Schlumberger Industries, Montrouge, France

[21] Appl. No.: 235,661

[22] Filed: Nov. 17, 1987

[30] Foreign Application Priority Data

Nov. 18, 1986 [FR] France ................................. 16 0000

[51] Int. Cl.⁴ ............................................. H04K 1/00
[52] U.S. Cl. ......................................... 380/9; 380/23; 379/146; 379/155
[58] Field of Search ............... 380/9, 23, 25; 379/143, 379/145, 146, 147, 148, 151, 154, 155, 124; 364/900

[56] References Cited

U.S. PATENT DOCUMENTS

| | | | |
|---|---|---|---|
| 3,982,073 | 9/1976 | Baltzer et al. | 379/124 |
| 4,039,768 | 8/1977 | O'Malley | 379/147 |
| 4,074,079 | 2/1978 | Prell et al. | 380/23 |
| 4,198,545 | 4/1980 | Haist et al. | 379/148 |
| 4,499,556 | 2/1985 | Halpern | 364/900 |
| 4,567,325 | 1/1986 | Crouch et al. | 379/145 |
| 4,698,840 | 10/1987 | Dively et al. | 379/155 |
| 4,760,594 | 7/1988 | Reed | 379/146 |
| 4,787,045 | 11/1988 | Storace et al. | 380/23 |

Primary Examiner—Salvatore Cangialosi
Attorney, Agent, or Firm—Sanford J. Asman

[57] ABSTRACT

The present invention relates to a device for starting telephone charging in a pay phone.

The starting device essentially comprises a scrambler circuit (42) which is inserted in the line (26) when the handset is taken off-hook and which is inhibited only when the user actuates a pushbutton (20), and a microphone inhibit circuit (40) which is inserted when the user dials the called number and which inhibits simultaneously with the circuit (42). Charging begins when the button (20) is actuated.

8 Claims, 2 Drawing Sheets

DEVICE FOR STARTING CHARGING IN A PAY PHONE

The present invention relates to a device for starting telephone charging in a pay phone.

The present invention provides a special arrangement for pay phones which are freely available to users who have no particular contract for using the particular phone in question. That is what the term "pay phone" means in the present text. The pay phone may be in a telephone box installed on the public highway or in a public place, or it may be a telephone installed in a commercial establishment and made available to the customers of the establishment, etc.

With this type of telephone, it is necessary to prevent users from making a telephone call with a third party without the user paying a telephone charge, and in addition, the telephone call must not continue for longer than the time corresponding to the paid-up amount. As a result pay phones may be provided with a coin slot mechanism for accepting money inserted by the user in the form of coins. The telephone call is authorized for a period of time corresponding to the amount of money inserted into the slot mechanism, which amount of money may naturally be increased by the user if a call is to be prolonged. Pay phones may also be equipped to operate with payment cards. In this case, the pay phone is provided with a card "reader" which serves to reduce the balance contained in the card memory as a telephone call proceeds.

Regardless of the method of payment used, it is necessary for the pay phone to have the following information available: the beginning of the phone call; the number of charge units consumed; and the value of the telephone charge unit.

There are certain difficulties associated with providing the pay phone with the first item of information. In general, the beginning of a telephone call, and thus the beginning of call charging, is defined at the instant at which the called party answers the call, i.e. goes off-hook. Several systems have been proposed for defining the instant at which charging begins:

In France, pay phones are connected to telephone exchanges over special lines. The telephone exchange sends a periodic signal to the pay phone in question indicating both the beginning of charging and the beginning of each charge unit. The pay phone itself processes these signals in order to keep permanent track of the amount of telephone charge money due.

In the United States, such remote-metering lines do not exist. The entire operation is controlled manually by an operator.

In other countries, the start of charging is obtained at the telephone set by detecting the reversal of line polarity which takes place when the called party answers. It can thus be seen, that in previously described systems, the instant at which charging begins is defined in a manner which depends on the type of telephone network which is installed. In order to remedy this defect, one proposal consists in fitting pay phones with circuits capable of processing the received electrical signal in order to distinguish the portion of the signal which corresponds to the called telephone ringing, and the portion thereof which corresponds to the voice of the called party. However, such signal processing systems are complex and not very reliable.

An object of the invention is to provide a device for starting charging in a pay phone, which device is adaptable to any type of telephone network, and is both reliable and low in cost.

According to the invention, this aim is achieved by a device for starting telephone charging, said device being characterized in that it comprises:

prevention means for preventing the microphone of the handset of said pay phone from operating;

first control means for inhibiting said prevention means;

scrambler means for allowing only the signal corresponding to ringing tone to reach the earpiece of the handset and for scrambling the signal corresponding to the human voice;

second control means for inhibiting said filter means; and use-operable means operatable by the user of said pay phone, with operation of said means serving firstly to actuate said first and second control means to inhibit said prevention means and said filter means, and secondly causing telephone charging to begin.

It can thus be understood that the system is very reliable and very simple and that it is completely effective, since if the user forgets to act on the manual actuation means, e.g. a simple pushbutton, the speech of the called party will be unintelligible and the user will not be able to speak either, whereas in contrast once the user had acted on the manual actuator, charging begins.

Figure 2:
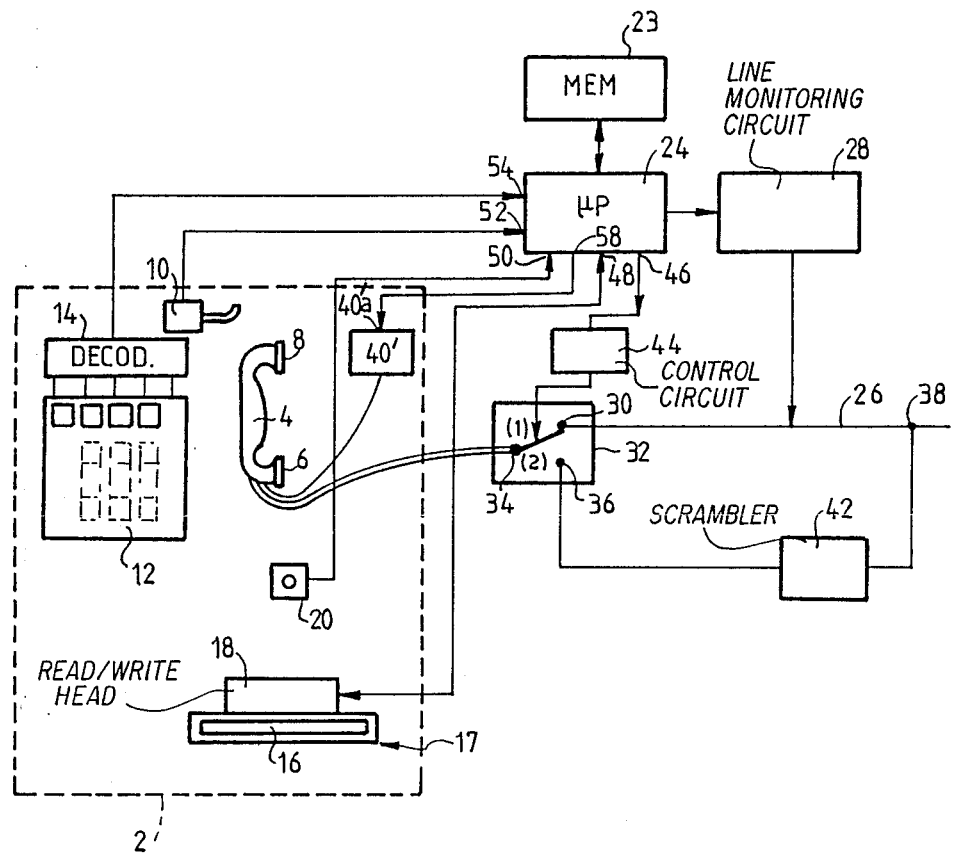

Other characteristics and advantages of the invention appear more clearly on reading the following description of embodiments of the invention given by way of non-limiting example. The description refers to the accompanying drawings, in which:

FIG. 1 shows a pay phone provided with a device for starting charging in accordance with a first embodiment of the invention; and FIG. 2 shows a pay phone provided with a device for starting charging in accordance with a second embodiment of the invention.

FIG. 1 is a diagram of a pay phone 2 including a handset 4 having a microphone 6 and an earpiece 8. The handset 4 is associated with a hook system 10 which delivers an off-hook signal S when the handset 4 is unhooked. The telephone 2 also includes a conventional keypad 12 or a dial associated with a decoder 14, and a memory card reader 17 which is represented by its card-receiving slot 16 and its read/write head 18. Finally, it includes a manually controlled button 20 is shown whose function is explained below.

The telephone also includes electronic processing circuits, and of these circuits a microprocessor 24 and an associated memory 23 are shown. Finally, FIG. 1 shows the telephone line 26 and a line monitoring circuit 28.

The line 26 is connected to terminal 30 of a two-position switch 32. The common point 34 of the switch 30 is connected to the handset 4. The second terminal 36 of the switch 32 is connected to a point 38 of the line 26 via a microphone-inhibit circuit 40 and via a scrambler circuit 42, which circuits 40 and 42 are connected in series. The switch 32 is associated with a control circuit 44 which serves to place the switch in one of two positions referenced (1) and (2) in the figure.

The microprocessor 24 is naturally connected to its memory 23. The memory 23 contains data relating, in particular, to call charging, and instructions for controlling the sequence of steps described below. The microprocessor has an output terminal 46 connected to the control circuit 44 of the switch 32. Input/output circuits 48 are connected to the read/write circuit of the card reader 17. The pushbutton 20, the hook switch 10 and the keypad decoder 14 are respectively connected to inputs 50, 52, and 54 of the microprocessor 24.

When the telephone is at rest, i.e. when the handset is on-hook, the switch 32 is in its position (2), i.e. the common point 34 is connected to the terminal 36. Under these conditions, the handset 4 is connected to the telephone line 26 via the scrambler circuit 42 and the microphone-inhibit circuit 40. The circuits 40 and 42 are described in greater detail below.

At this stage of the description, it suffices to specify that while it is activated, the circuit 40 prevents the electrical signal delivered by the microphone 6 in the handset from being applied to the line 26, and that the circuit 42 ensures that the ringing tone from the line 26 is fully transmitted to the earpiece 8, whereas a signal corresponding to the human voice is scrambled and the scrambled sounds delivered to the earpiece is incomprehensible for the user.

When a user lifts the handset 4, the hook switch circuit 10 delivers a signal S which activates the microprocessor assembly 24, and the microprocessor 24 verifies that the switch 32 is indeed in position (2). If it is not in that position, the microprocessor instructs the circuit 44 to place the switch 32 in said position. As a result, the circuits 40 and 42 are on-line and activated.

The user then inserts a card into the slot 16 of the card reader. This operation triggers a succession of verifications which are well-known for machines controlled by such cards, namely: verification that the card is authentic; and verification that some credit balance remains available in the card memory. Once these verifications have been performed, the user keys in the number of the telephone to be called using the keypad 12. As soon as the user has keyed in the first digit of the number, the decoder 14 applies a special signal to the microprocessor 24. This information decoded by the circuit 14 is transmitted to the microprocessor 24. The microprocessor uses this data to determine the cost of the telephone call unit and the duration of said unit on the basis of its charging tables stored in the memory 23. This information is also transmitted to the line monitoring circuit 28. A connection is set up to the called telephone.

Since the circuit 42 passes ringing tone, the caller hears the ringing tone. If the called party answers and begins to speak, the caller hears that ringing has ceased, but cannot understand what the called party is saying because of the circuit 42. In addition, the caller cannot speak because the inhibit circuit 40 is active. It is then necessary for the caller to press the button 20, in a manner explained by instructions on the pay phone. The signal from the button is applied to the microprocessor 24 and it in turn applies a control signal to the circuit 44 to move the switch 32 to position (1). Simultaneously, the signal delivered by the button 20 initializes charging calculations, i.e. the counting-down of telephone units consumed. Since the switch 32 is in position (1), the telephone signal arrives directly to the handset 4 without passing through the circuits 40 and 42. The two parties can thus speak to each other normally. The microprocessor 24 calculates the successive charging amounts that need paying as the telephone call takes place and it periodically causes the read/write head 18 to decrement the balance recorded in the card memory.

At the end of the telephone call, the user hangs up the handset. The hook switch circuit 10 delivers a signal which defines the end of the charging period. In addition, the microprocessor responds to this signal by applying a signal to the control circuit of the switch 32 in order to return the switch to its position (2). The signal delivered by the hook switch circuit 10 then puts the microprocessor 24 into stand-by mode. The user can then remove the card from the slot 16.

The circuit 40 is preferably a complete filter for the signal delivered by the microphone 6. It is also preferable for the scrambler circuit 42 to be a bandpass filter centered on 400 Hz. Outside the range 350 Hz to 450 Hz, the filter provides attenuation of 48 dB per octave. As a result, this filter passes signals whose frequencies correspond to ringing tone, but very considerably attenuates signals corresponding to the human voice whose frequency is situated at about 800 Hz.

In an improved embodiment of the FIG. 1 device for starting charging, the microprocessor 24 applies a short (a few seconds) time delay between the appearance of the signal delivered by the pushbutton 20 and the effective start of charging. This time delay provided by the microprocessor serves to avoid charging the user for certain special cases where the call is answered and a voice signal is applied to the line without the voice corresponding to the party called by the user. This situation occurs, for example, when an international phone call is made and the exchange answers and applies a recorded announcement to the line for informing the user that the lines are engaged, etc. When the voice signal begins, it is scrambled by the circuit 42. As a result the user cannot tell whether it is a recorded announcement until after pressing on the button 20 in order to switch off the scrambling. By virtue of the time delay, the user is given enough time to understand that the message is recorded. So long as the user hangs up the handset 4 within the time delay period, there will be no charging. This is because the hook switch circuit 10 delivers a charge-stopping signal when the user hangs up the handset. However, if pressing on the button 20 does indeed establish a call, then the duration of the time delay is also charged to the user.

In yet another improvement, the off-hook signal S delivered by the circuit 10 starts another time delay, e.g. of two minutes. If the user does not press on the button 20 during this longer time delay, the telephone call is automatically interrupted. This is to avoid an ill-intentioned user from playing at not pressing on the button 20 even after the called party has answered.

In the above description, it has been assumed that the user pays the telephone charging by means of a card. Naturally, the scope of the invention also extends to charging being paid for in coin. The only modification that would be required by the circuit of the sole figure would be to replace the card reader 17 by a coin mechanism.

FIG. 2 shows a variant embodiment of the system for starting telephone charging in accordance with the invention. The only difference lies in the way the microphone inhibit circuit is connected. The circuit 40 of FIG. 1 is omitted and is replaced by a circuit 40' which acts directly on the microphone 6 in order to inhibit it. The circuit 40' comprises a control input 40'a which serves to switch microphone inhibition on when a control signal is received. The control input 40'a of the circuit 40' is connected to the output 58 of the microprocessor 24.

The operation of the FIG. 2 system differs from that of FIG. 1 in the following points only: when the user unhooks the handset 4, the microphone 6 is inhibited by the circuit 40' and the scrambler circuit 42 is active. When the user keys in the first digit of the called number via the keyboard 12, the decoder 14 applies a special signal to the microprocessor 24. When the user presses on the button 20, this serves, in addition to the functions already described above, to deactivate the circuit 40'. As a result the microphone 6 begins to work normally. It is clear from the above description that the device for starting telephone charging provides a satisfactory solution to the problem posed. The start of charging does not make use of any of the signals which reach the telephone. It is defined solely by the instant at which the user presses on the button 20. The circuits which oblige the user to press on the button 20, thereby triggering the start of charging, are very simple and very reliable in operation since they comprise firstly a switch and secondly a complete filter and a pass-band filter having common characteristics.

I claim:

1. A device for starting telephone charging in a pay phone, the device being characterized in that it comprises:
   prevention means (40, 40') for preventing the microphone of the handset of said pay phone from operating;
   first control means (32, 44) for inhibiting said prevention means;
   scrambler means (42) for allowing only the signal corresponding to ringing tone to reach the earpiece of the handset and for scrambling the signal corresponding to the human voice;
   second control means (32, 44) for inhibiting said filter means (42); and
   user-operable means (20) operatable by the user of said pay phone, with operation of said means serving firstly to actuate said first and second control means to inhibit said prevention means and said filter means, and secondly causing telephone charging to begin.

2. A device according to claim 1, characterized in that the prevention means comprise a complete filter (40) for completely filtering the signal delivered by the microphone, and in that the scrambler means comprise a bandpass filter centered on 400 Hz.

3. A device according to claim 2, characterized in that said first and second control means comprise switch means (32) for connecting said handset (4) to the telephone line (26) either directly or via said prevention means (40) and said scrambler means (42) which are connected in series, together means (40a) for activating said means for preventing operation.

4. A device according to claim 3, characterized in that it further includes means for introducing a time delay between the instant at which the user actuates said user-operable means (20) and the actual beginning of telephone call billing.

5. A device according to claim 1, characterized in that said first and second control means comprise switch means (32) for connecting said handset (4) to the telephone line (26) either directly or via said prevention means (40) and said scrambler means (42) which are connected in series, together means (40a) for activating said means for preventing operation.

6. A device according to claim 1, characterized in that it further includes means for introducing a time delay between the instant at which the user actuates said user-operable means (20) and the actual beginning of the telephone call billing.

7. A device according to claim 2, characterized in that it further includes means for introducing a time delay between the instant at which the user actuates said user-operable means (20) and the actual beginning of telephone call billing.

8. A device according to any one of claims 1 to 4, 6 to 8, characterized in that it further includes means for inserting a time delay which is started when the caller takes the handset (4) off-hook, with the telephone call being interrupted at the end of said time delay if the user still has not actuated said user-operable means (20).

* * * * *